(12) United States Patent
Takashima et al.

(10) Patent No.: US 9,819,584 B2
(45) Date of Patent: Nov. 14, 2017

(54) COMMUNICATION NODE, COMMUNICATION SYSTEM, CONTROL APPARATUS, PACKET FORWARDING METHOD, AND PROGRAM

(71) Applicant: NEC CORPORATION, Tokyo (JP)

(72) Inventors: Masanori Takashima, Tokyo (JP); Takahiro Otake, Tokyo (JP); Yoji Suzuki, Tokyo (JP); Tomohiro Kase, Tokyo (JP); Naoyuki Iwashita, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/426,626

(22) PCT Filed: Oct. 9, 2013

(86) PCT No.: PCT/JP2013/077476
§ 371 (c)(1),
(2) Date: Mar. 6, 2015

(87) PCT Pub. No.: WO2014/057977
PCT Pub. Date: Apr. 17, 2014

(65) Prior Publication Data
US 2015/0256457 A1    Sep. 10, 2015

(30) Foreign Application Priority Data

Oct. 10, 2012    (JP) .................................. 2012-224713

(51) Int. Cl.
*H04L 12/741*    (2013.01)
*H04L 12/46*    (2006.01)
(Continued)

(52) U.S. Cl.
CPC ........ *H04L 45/745* (2013.01); *H04L 12/4625* (2013.01); *H04L 45/36* (2013.01); *H04L 45/64* (2013.01); *H04L 69/22* (2013.01)

(58) Field of Classification Search
None
See application file for complete search history.

(56) References Cited

U.S. PATENT DOCUMENTS 8,098,677 B1    1/2012  Pleshek et al.
8,391,289 B1 *  3/2013  Yalagandula ....... H04L 12/2818
                                                    370/392
(Continued)

FOREIGN PATENT DOCUMENTS

CN    102576343 A    7/2012
CN    102594664 A    7/2012
(Continued)

OTHER PUBLICATIONS

"OpenFlow Switch Specification" Feb. 28, 2011, Version 1.1.0 Implemented (Wire Protocol 0x02), 56 pages.
(Continued)

*Primary Examiner* — Ayaz Sheikh
*Assistant Examiner* — Tarell Hampton
(74) *Attorney, Agent, or Firm* — Sughrue Mion, PLLC

(57) ABSTRACT

The communication device comprises a first table that stores a first entry in which a match condition that includes at least a destination address is associated with an output destination of a packet matching the match condition; a second table that stores a second entry having a predetermined match condition; a destination learning unit that registers a set of a source and a receiving port of a received packet as a match condition and an output destination, respectively, in the first table; and a packet processing unit that forwards a packet to an output destination determined in the first table when an
(Continued)

entry having a match condition matching a received packet is found from each of the first and second tables. The packet processing unit broadcasts a received packet according to a third entry when no entry having a match condition matching the received packet is found.

12 Claims, 9 Drawing Sheets

(51) Int. Cl.
  *H04L 12/721* (2013.01)
  *H04L 12/715* (2013.01)
  *H04L 29/06* (2006.01)

(56) References Cited

U.S. PATENT DOCUMENTS

| | | | |
|---|---|---|---|
| 8,842,673 B2 | 9/2014 | Akiyoshi | |
| 8,842,674 B2 | 9/2014 | Akiyoshi | |
| 8,873,398 B2* | 10/2014 | Kempf | 370/216 |
| 2005/0141537 A1 | 6/2005 | Kumar et al. | |
| 2006/0092860 A1* | 5/2006 | Higashitaniguchi | H04L 41/12 370/255 |
| 2008/0165705 A1* | 7/2008 | Umayabashi | H04L 45/48 370/256 |
| 2011/0007741 A1 | 1/2011 | Kreeger et al. | |
| 2011/0286324 A1* | 11/2011 | Bellagamba | H04L 41/0677 370/219 |
| 2012/0113987 A1 | 5/2012 | Riddoch et al. | |
| 2012/0170477 A1* | 7/2012 | Hieda | H04L 12/4625 370/252 |
| 2012/0185856 A1 | 7/2012 | Ashihara et al. | |
| 2012/0263186 A1* | 10/2012 | Ueno | H04L 45/38 370/401 |
| 2012/0300615 A1* | 11/2012 | Kempf | H04W 24/02 370/216 |
| 2013/0028073 A1* | 1/2013 | Tatipamula | H04L 41/12 370/218 |
| 2013/0064243 A1 | 3/2013 | Akiyoshi | |
| 2013/0108263 A1* | 5/2013 | Srinivas | H04Q 3/0083 398/45 |
| 2013/0176850 A1* | 7/2013 | Mishra | H04L 49/00 370/235 |
| 2013/0230047 A1* | 9/2013 | Subrahmaniam | H04L 47/2441 370/392 |
| 2013/0235869 A1 | 9/2013 | Akiyoshi | |
| 2014/0003232 A1* | 1/2014 | Guichard | H04L 67/16 370/230 |
| 2014/0044130 A1* | 2/2014 | Banavalikar | H04L 49/351 370/392 |
| 2014/0098669 A1* | 4/2014 | Garg | H04L 47/12 370/235 |
| 2014/0348171 A1 | 11/2014 | Akiyoshi | |
| 2014/0348172 A1 | 11/2014 | Akiyoshi | |
| 2014/0355615 A1 | 12/2014 | Chang | |

FOREIGN PATENT DOCUMENTS

| | | |
|---|---|---|
| JP | 2011-188433 A | 9/2011 |
| RU | 2347327 C2 | 2/2009 |
| WO | 2004089030 A1 | 10/2004 |
| WO | 2012/070173 A1 | 5/2012 |

OTHER PUBLICATIONS

Nick McKeown et al., "OpenFlow: Enabling Innovation in Campus Networks", Mar. 14, 2008, pp. 1-6.
International Search Report for PCT/JP2013/077476 dated Jan. 14, 2014.
Communication dated Feb. 4, 2016, issued by the Federal Service for Intellectual Property in corresponding Russian Application No. 2015117659/08.
"OpenFlow Switch Specification," Open Networking Foundation, Sep. 6, 2012, Ver. 1.3.1 (Wire Protocol 0x04), ONF TS-007, 128 pages.
Omar El Ferkouss et al., "On the Flexibility of MPLS Applications over an OpenFlow-enabled Network," IEEE Globecom 2011 proceedings, 2011, 6 pages.
Jun Bi, "The Challenges of SDN/OpenFlow in an Operational and Large-scale Network," Tsinghua University/CERNET Open Networking Summit 2012, Apr. 17, 2012, 28 pages.
Communication dated Apr. 26, 2016 from European Patent Office in counterpart Application No. 13844836.0.
Communication dated Dec. 22, 2016, from the State Intellectual Property Office of People's Republic of China in counterpart Application No. 201380052800.1.

* cited by examiner

COMMUNICATION NODE, COMMUNICATION SYSTEM, CONTROL APPARATUS, PACKET FORWARDING METHOD, AND PROGRAM

REFERENCE TO RELATED APPLICATION

This application is a National Stage of International Application No. PCT/JP2013/077476 filed Oct. 9, 2013, claiming priority based on Japanese patent application No. 2012-224713 filed on Oct. 10, 2012, the disclosure of all of which are incorporated herein in their entirety by reference thereto.

TECHNICAL FIELD

The present invention relates to a communication node, communication system, control apparatus, packet forwarding method, and program, and to a communication node, communication system, control apparatus, packet forwarding method, and program centrally controlled by a control apparatus.

BACKGROUND

In recent years, a technology called OpenFlow has been proposed (refer to Non-Patent Literatures 1 and 2). OpenFlow treats communication as an end-to-end flow and performs path control, failure recovery, load balancing, and optimization for each flow. An OpenFlow switch, specified in Non-Patent Literature 2, comprises a secure channel for communicating with an OpenFlow controller and operates according to a flow table suitably appended or rewritten by the OpenFlow controller. In the flow table, a set of matching conditions (Match Fields) matching a packet header, flow statistics (Counters), and Instructions defining the content of processing is defined for each flow (refer to the section of "4.1 Flow Table" in Non-Patent Literature 2).

For instance, upon receiving a packet, the OpenFlow switch searches for an entry having a matching condition (refer to "4.3 Match Fields" in Non-Patent Literature 2) that matches the header information of the received packet in the flow table. When an entry matching the received packet is found as a result of the search, the OpenFlow switch updates the flow statistics (Counters) and performs the processing content (packet transmission from a designated port, flooding, discard, etc.) written in the instruction field of the entry on the received packet. On the other hand, when no entry matching the received packet is found as a result of the search, the OpenFlow switch requests the OpenFlow controller to set the entry via the secure channel, transmitting a request (Packet-In message) to transmit control information for processing the received packet. The OpenFlow switch receives a flow entry that defines processing contents and updates the flow table. As described, the OpenFlow switch forwards packets using entries stored in the flow table as control information.

[Non-Patent Literature 1]
Nick McKeown, et. al. "OpenFlow: Enabling Innovation in Campus Networks," [online], [searched on Oct. 4, 2012], the Internet <URL: http://www.openflow.org/documents/openflow-wp-latest.pdf>

[Non-Patent Literature 2]
"OpenFlow Switch Specification" Version 1.1.0 Implemented (Wire Protocol 0x02), [online], [searched on Oct. 4, 2012], the Internet <URL: http://www.openflow.org/documents/openflow-spec-v1.1.0.pdf>

SUMMARY

The following analysis is given by the present invention. Further, each disclosure of the cited literatures is incorporated herein by reference thereto. In a centralized control network, represented by OpenFlow in Non-Patent Literatures 1 and 2, an entry needs to be set in a communication node such as a switch on the path for each additional flow. As a result, there is a problem that the number of flow entries increases in response to an increase in combinations of connection terminals and communication destinations, increasing the load on a control apparatus 20.

In addition to the increase in the load on the controller (the control apparatus), an increase in the number of entries held by each communication node increases the amount of the time it takes to search for an entry in a communication node, impacting the response performance. Similarly, the increase in the number of entries held by each communication node increases the load on the control apparatus 20, which manages the communication nodes. Therefore, there is a demand to keep the number of entries held by a communication node to a minimum.

It is an object of the present invention to provide a communication node, communication system, control apparatus, packet forwarding method, and program capable of contributing to the reduction of the number of entries held by a communication node and the reduction of the load on a control apparatus in a centralized control network.

According to a first aspect, there is provided a communication node comprising a first table that stores a first entry in which a match condition that includes at least a destination address is associated with an output destination of a packet matching the match condition; a second table that stores a second entry having a match condition set by a predetermined control apparatus; a destination learning unit that registers a set of a source and a receiving port of a received packet as a match condition and an output destination, respectively, in the first table; and a packet processing unit that forwards a packet to an output destination determined in the first table when an entry having a match condition matching a received packet is found from each of the first and second tables, and that broadcasts a received packet according to a third entry set by the control apparatus when no entry having a match condition matching the received packet is found in at least one of the first and second tables.

According to a second aspect, there is provided a communication system including a plurality of communication nodes that comprise a first table that stores a first entry in which a match condition that includes at least a destination address is associated with an output destination of a packet matching the match condition; a second table that stores a second entry having a predetermined match condition; a destination learning unit that registers a set of a source and a receiving port of a received packet as a match condition and an output destination, respectively, in the first table; and a packet processing unit that forwards a packet to an output destination determined in the first table when an entry having a match condition matching a received packet is found from each of the first and second tables and that broadcasts a received packet according to a third entry when no entry having a match condition matching the received packet is found in at least one of the first and second tables; and a control apparatus that calculates a broadcast path in a network constituted by the plurality of communication nodes and that sets entries in at least the second tables of the communication nodes according to the broadcast path.

According to a third aspect, there is provided a control apparatus setting entries in the tables of the communication nodes.

According to a fourth aspect, there is provided a packet forwarding method including having a communication node that comprises a first table that stores a first entry in which a match condition that includes at least a destination address is associated with an output destination of a packet matching the match condition; a second table that stores a second entry having a predetermined match condition; a destination learning unit that registers a set of a source and a receiving port of a received packet as a match condition and an output destination, respectively, in the first table; and a packet processing unit forward a packet to an output destination determined in the first table when an entry having a match condition matching a received packet is found from each of the first and second tables; and having the communication node broadcast a received packet according to a third entry when no entry having a match condition matching the received packet is found in at least one of the first and second tables. The method is tied to a particular machine, which is the communication node that processes a received packet according to an entry having a match condition that matches the received packet.

According to a fifth aspect, there is provided a program having a computer built into a communication node that comprises a first table that stores a first entry in which a match condition that includes at least a destination address is associated with an output destination of a packet matching the match condition; a second table that stores a second entry having a predetermined match condition; a destination learning unit that registers a set of a source and a receiving port of a received packet as a match condition and an output destination, respectively, in the first table; and a packet processing unit execute a process of forwarding a packet to an output destination determined in the first table when an entry having a match condition matching a received packet is found from each of the first and second tables; and a process of broadcasting a received packet according to a third entry when no entry having a match condition matching the received packet is found in at least one of the first and second tables. Further, this program can be stored in a computer-readable (non-transitory) storage medium. In other words, the present invention can be realized as a computer program product.

According to the present invention, the number of entries retained in a communication node and the load on a control apparatus in a centralized control network can be reduced.

PREFERRED MODES

Figure 1:
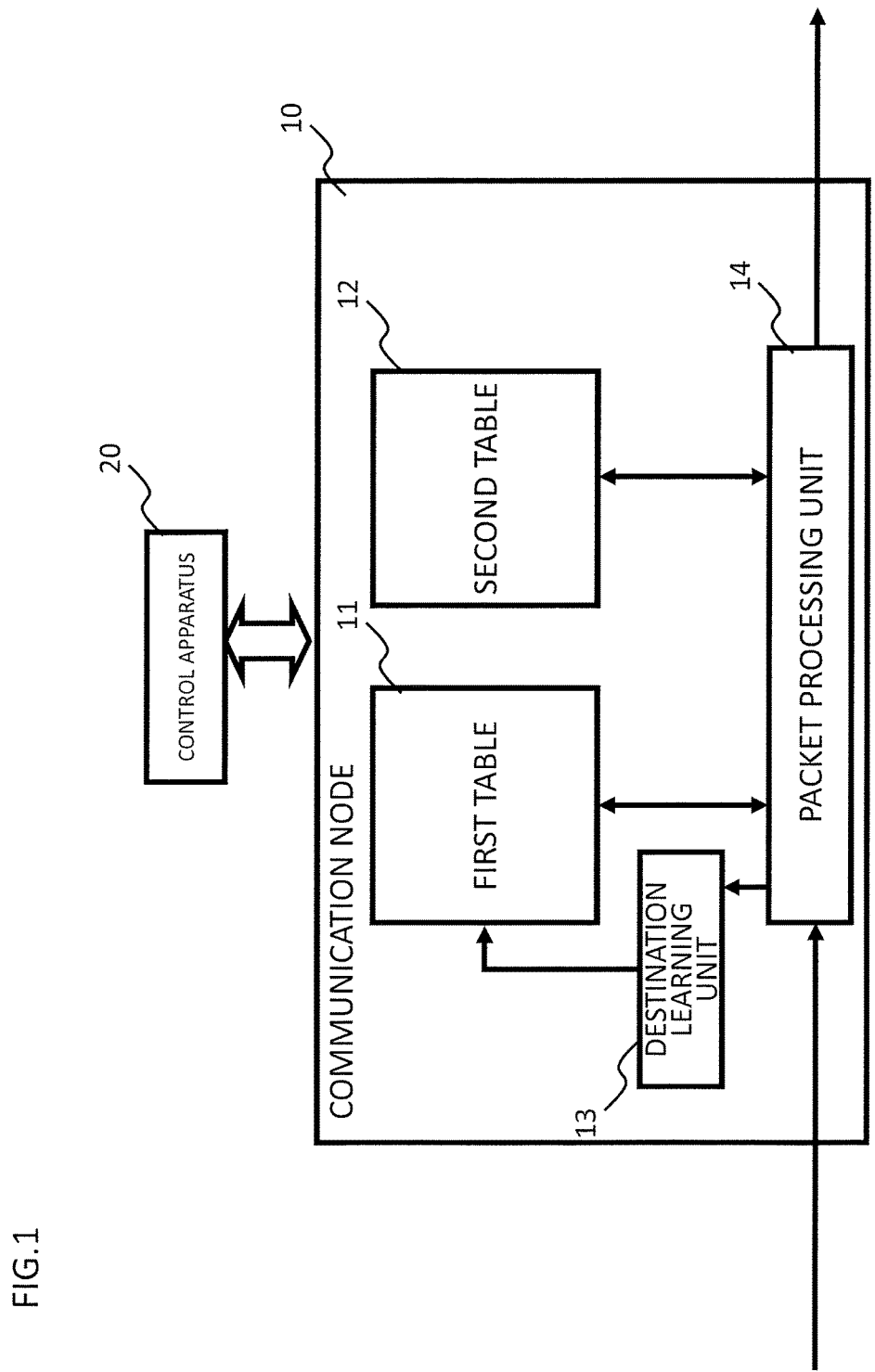
FIG. 1 is a drawing showing the configuration of an exemplary embodiment.

First, a summary of an exemplary embodiment of the present invention will be given with reference to the drawings. Note that drawing reference signs in the summary are given to each element as an example solely to facilitate understanding for convenience and are not intended to limit the present invention to the modes shown in the drawings.

As shown in FIG. 1, an exemplary embodiment disclosed in the present application can be realized with a configuration that includes a communication node 10 that comprises first and second tables 11 and 12, a destination learning unit 13, and a packet processing unit 14, and a control apparatus 20.

The first table 11 stores a first entry in which a match condition that includes at least a destination address is associated with the output destination of a packet matching the match condition. The second table 12 stores a second entry having a source address as a match condition. Here, it is assumed that the control apparatus 20 detects that terminals A to C are connected and that a second entry having the addresses of the terminals A to C as the source addresses is set in the second table 12.

The destination learning unit 13 registers a set of the source and the receiving port of a received packet as a first entry in which a match condition is associated with an output destination in the first table 11.

The packet processing unit 14 forwards a packet to an output destination determined in the first table when an entry having a match condition matching a received packet is found from each of the first and second tables 11 and 12, and broadcasts a received packet according to a third entry set by the control apparatus 20 when no entry having a match condition matching the received packet is found in at least one of the first and second tables. Further, the third entry may be stored in the second table 12 in such a manner that a lower priority than the second entry is applied thereto, or it may be stored in a third table that should be referred to after the second table 12.

Figure 2:
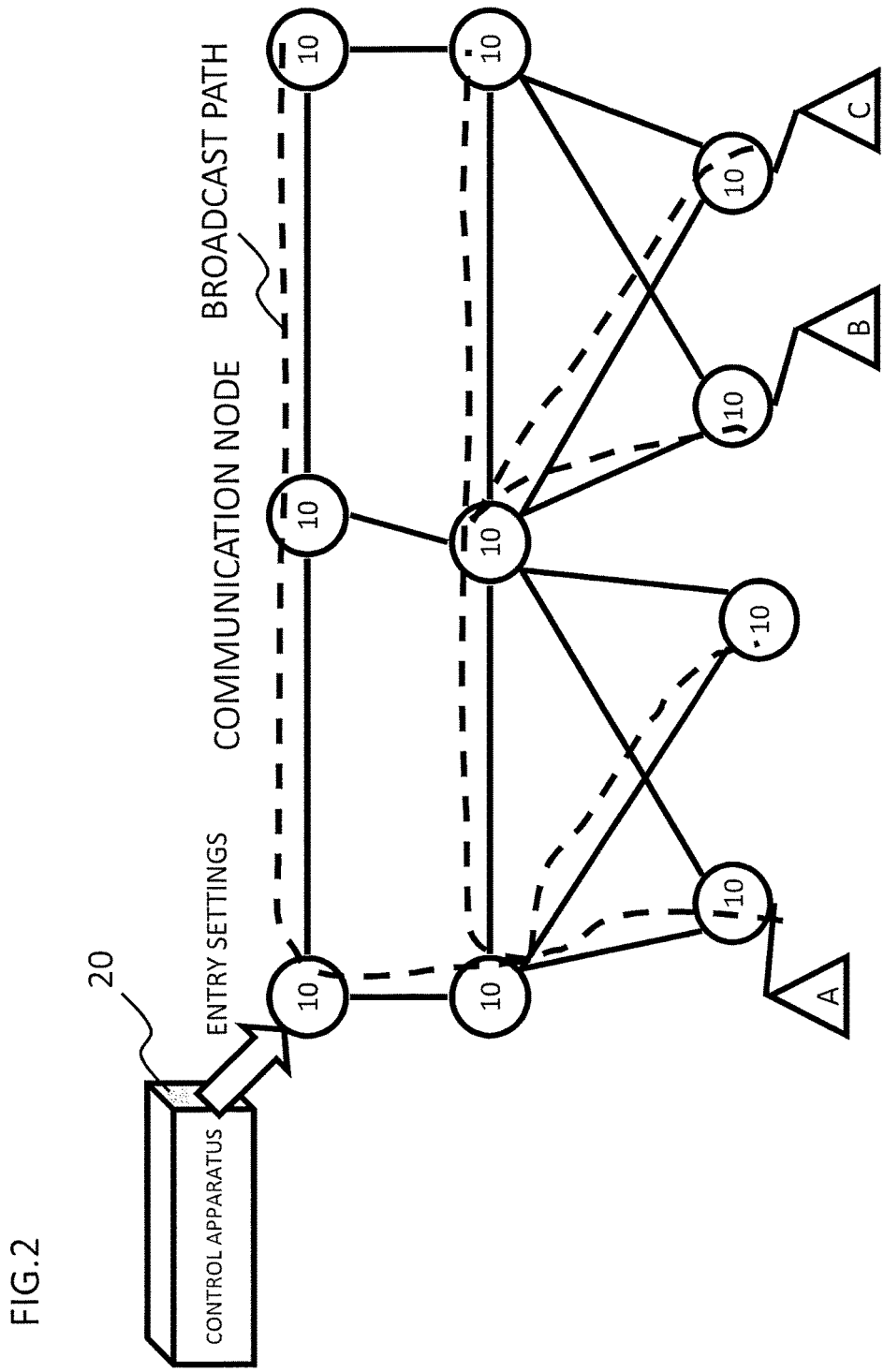
FIG. 2 is a drawing for explaining the operation of an exemplary embodiment.

For instance, as shown in FIG. 2, in a case where the terminals A to C are connected in a network constituted by a plurality of the communication nodes 10, the terminal C transmits a packet to the terminal A. The dashed lines in FIG. 2 denote broadcast/multicast paths (referred to as BCMC paths hereinafter) calculated by the control apparatus 20.

The communication node 10 receives the packet from the terminal C, but since the first table 11 has no entry having a match condition matching the packet from the terminal C (since the packet has not been learned yet), the communication node 10 forwards the received packet according to the third entry that realizes the broadcast path shown in FIG. 2.

Upon receiving the packet from the terminal C to the terminal A, which is forwarded according to the broadcast path, the destination learning unit 13 of a communication node 10 on this forward path registers a set of the source (the terminal C) and the receiving port (the receiving port of the packet from the terminal C) of the received packet as a first entry having the set as a match condition and an output destination in the first table 11.

Then, when the terminal A that has received the broadcast packet transmits a response packet to the terminal C, the communication node 10 determines that a first entry is found since the first entry having the destination address of the terminal C as the match condition and the port that received the packet from the terminal C as the output destination is registered in the first table 11 of the communication device 10 on the path. Further, as described, since the second entry having the terminal A, the source, as a match condition is registered by the control apparatus 20 in the second table of the communication node 10, the communication device 10 determines that a second entry is found. As a result, the response packet from the terminal A to the terminal C is unicast-forwarded to the terminal C.

In the forwarding process, the destination learning unit 13 of the communication node 10 registers a set of the source (the terminal A) and the receiving port (the receiving port of the packet from the terminal A) of the response packet as a first entry having the set as a match condition and an output destination in the first table 11. As a result, subsequent packets from the terminal C to the terminal A will match the first and second entries and will be unicast-forwarded.

As described, a forward operation such as layer 2 switching is realized using a centralized control network, and the number of entries held by a forwarding node on the path and the load on the control apparatus 20 are reduced.

[Exemplary Embodiment 1]

Figure 3:
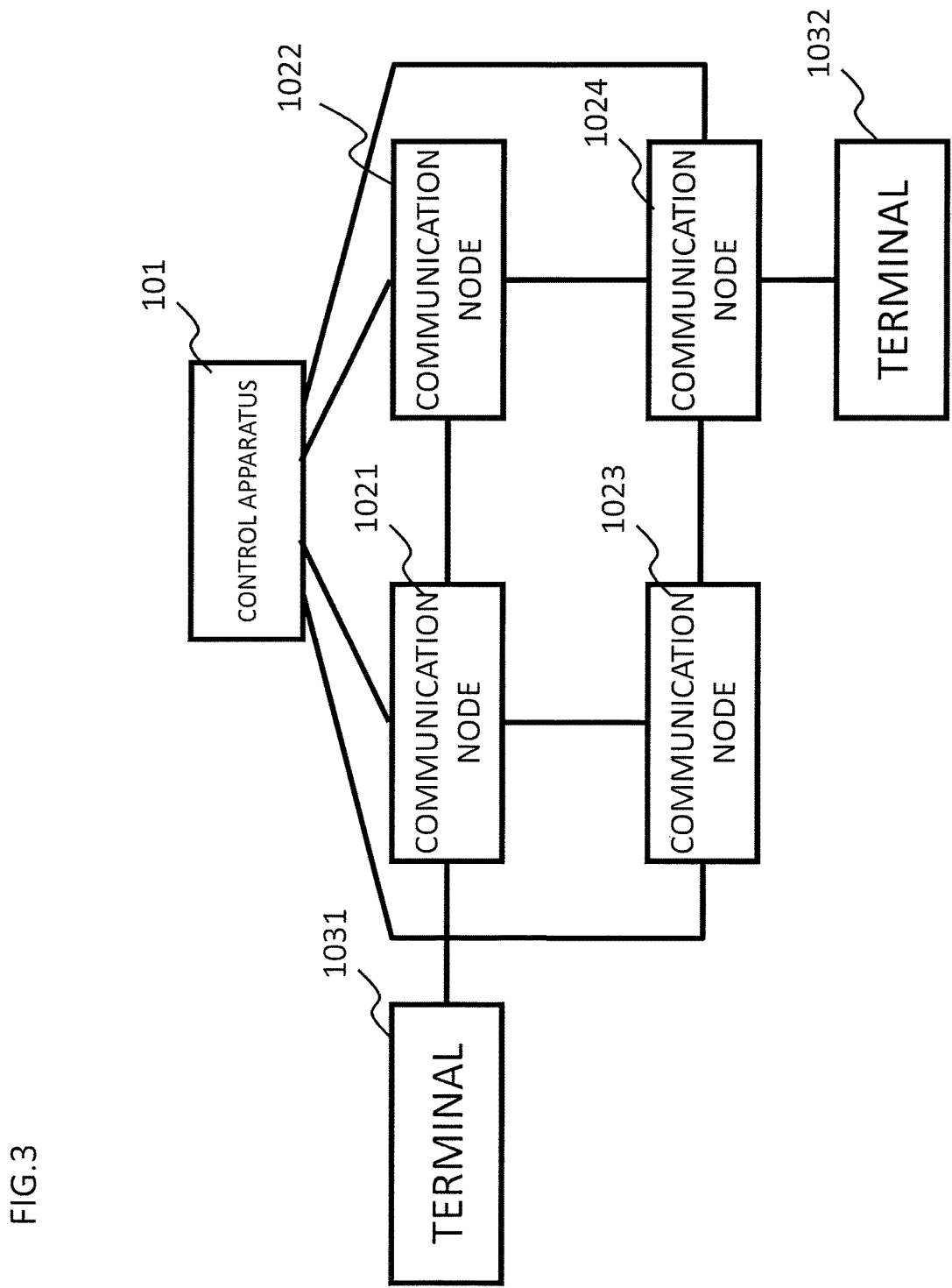
FIG. 3 is a drawing showing the configuration of a communication system of a first exemplary embodiment.

Next, a first exemplary embodiment will be described with reference to the drawings. FIG. 3 is a drawing showing the configuration of a communication system of the first exemplary embodiment. FIG. 3 shows a configuration that includes communication nodes 1021 to 1024 connected via data transfer links, and a control apparatus 101 that controls these communication nodes 1021 to 1024 via control links. Further, a terminal 1031 is connected to the communication node 1021, and a terminal 1032 is connected to the communication node 1024.

The control apparatus 101 calculates a BCMC path on the basis of the network topology constituted by the communication nodes 1021 to 1024. Further, the control apparatus 101 sets entries realizing the calculated BCMC paths for the communication nodes 1021 to 1024 using the OpenFlow protocol in Non-Patent Literature 2. The control apparatus 101 resisters entries for miss-hits in the first tables of the communication nodes 1021 to 1024, and registers entries for recognizing known transmission sources (source MAC entries) and entries for broadcasting in the second table of the communication nodes 1021 to 1024. The contents will be described more concretely along with a detailed configuration of the communication nodes 1021 to 1024. Further, the control apparatus 20 described above can be realized by using the OpenFlow controller in Non-Patent Literatures 1 and 2 as a basis and adding entry operation functions described later thereto.

The terminals 1031 and 1032 are personal computers and various mobile terminals that perform communication via a network constituted by the communication nodes 1021 to 1024.

Figure 4:
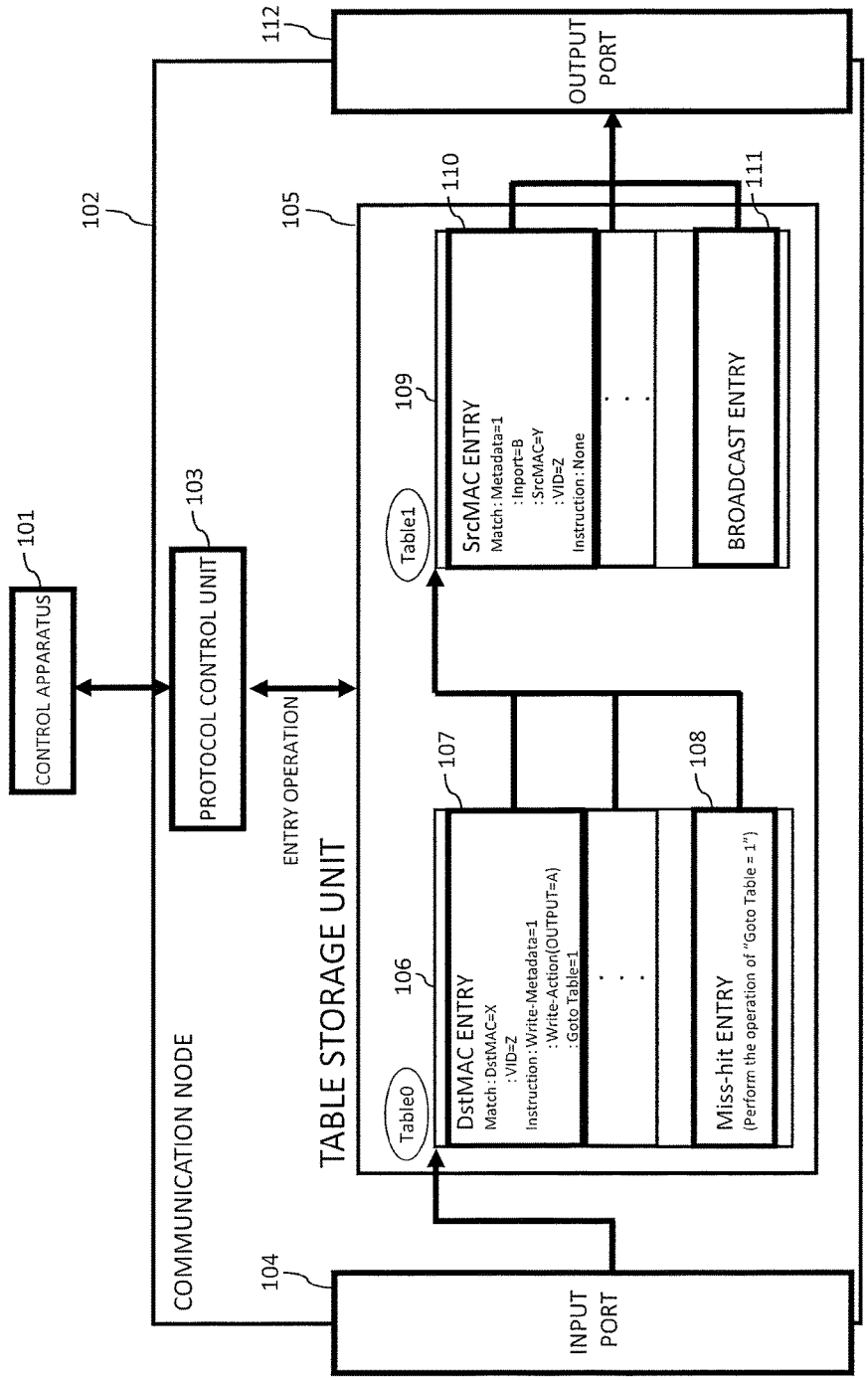
FIG. 4 is a block diagram showing a detailed configuration of a communication node of the first exemplary embodiment.

FIG. 4 is a block diagram showing a detailed configuration of the communication node of the first exemplary embodiment. The communication nodes 1021 to 1024 are referred to as the "communication node 102" hereinafter when they are not particularly distinguished from each other.

As shown in FIG. 4, the communication node 102 comprises a protocol control unit 103 that exchanges control messages with the control apparatus 101, an input port 104, a table storage unit 105, and an output port 112. Note that the destination learning unit 13 and the packet processing unit 14 shown in FIG. 1 are omitted in FIG. 4 to simplify the explanation, but packet processing in the communication node 102 is determined by search results in two tables (Table 0 (sign 106) and Table 1 (sign 109)) stored in the table storage unit 105. Further, the communication node 102 comprises a learning function of registering an entry (destination MAC entry) in which a destination address is associated with an output port in Table 0 (sign 106) according to a received packet.

The table storage unit 105 stores Table 0 (sign 106) and Table 1 (sign 109), which are pipeline processed. In pipeline processing, a plurality of tables are referred to in a predetermined order, match conditions of entries in each table are matched while packet data and metadata are rewritten as necessary, and at least an action of processing is determined (refer to "4. 1. 1 Pipeline Processing" in Non-Patent Literature 2).

In the present exemplary embodiment, Table 0 (sign 106) is referred to first before Table 1 (sign 109). Therefore, when the input port 104 receives a packet, an entry having a match condition matching the received packet is searched in Table 0 (sign 106) first.

In the example of FIG. 4, Table 0 (sign 106) stores a Dst MAC (destination MAC) entry 107 and a Miss-hit entry 108.

The Dst Mac entry 107 corresponds to the first entry described above and is set by the destination learning unit (not shown in the drawing) of the communication node 102 during the operation. For instance, when a packet having X as the source MAC (Media Access Control) address (Src MAC), Y as the destination MAC address (Dst MAC), and Z as the VLAN ID (Virtual Local Area Network ID) (referred to as {Src MAC: X, Dst MAC: Y, VID: Z} hereinafter) is received by an input port A, the destination learning unit of the communication node adds the following entry to Table 0 (sign 106).

Match condition: Dst MAC=X and VID=Z
Instruction: Write-Metadata=1
   Write-Action=(OUTPUT=A)
   Goto Table 32 1

Here, as metadata, "Write-Metadata" instructs the processing of raising a flag "1" indicating that the match condition of the Dst MAC entry has been hit. Further, "Write-Action (OUTPUT=A)" instructs the forwarding of applicable packets from a port A of the output port 112. Further, "Goto Table=1" instructs Table 1 (sign 109) to be referred to and entries to be searched.

The Miss-hit entry 108 is an entry (fourth entry) set by the controller at the start of an operation. The entry instructs Table 1 (sign 109) to be referred to and entries to be searched when a received packet does not hit any of the learned Dst MAC entries 107.

Further, in the example of FIG. 4, Table 1 (sign 109) stores a Src MAC entry 110 and a broadcast entry 111.

The Src MAC entry corresponds to the second entry described above and is set by the control apparatus 101 during the operation. For instance, when the control apparatus 101 recognizes the location of a user (terminal) {a user having a MAC address of Y and a VID of Z is connected to a port B of the communication node}, the control apparatus 101 sets the following entry in the communication node 102 as the Src MAC entry 110.

Match condition: Metadata=1 and Inport=B and Src MAC=Y and VID=Z
Instruction: None As described, due to the setting of the Dst MAC entry 107 and the Src MAC entry 110, the communication node 102 performs unicast forwarding operation on packets hitting the Dst MAC entry 107 and the Src MAC entry 110 from the port A set as "Write-Action" in the Dst MAC entry 107.

Further, any one or more of the match conditions (Src MAC, input port (Inport) and VID) of the Src MAC entry 110 can be omitted. When none of these conditions is deemed a match condition, the following Src MAC entry 110 is set.

Match condition: Metadata=1
Instruction: None

In this case, only the fact that the Dst MAC entry 107 is hit triggers unicast forwarding from the port A set in the Dst MAC entry 107 as "Write-Action."

The broadcast entry 111 is an entry (the third entry) set by the controller at the start of an operation. The broadcast entry 111 forwards packets that do not hit any Src MAC entry 110 via the broadcast path set by the control apparatus 101 (including a case where the Dst MAC entry 107 is not hit and the flag "1" is not raised in Metadata).

As described above, the packet processing unit (not shown in the drawing) of the communication node 102 continues to refer to Table 0 (sign 106) and Table 1 (sign 109) of the table storage unit 105 in order, and output a packet to the determined port.

The operation of the packet processing unit (not shown) of the communication node 102 will be described by showing a concrete example. Below, it is assumed that the Dst MAC entry 107 and the Src MAC entry 110 are set in Table 0 (sign 106) and Table 1 (sign 109) as follows.

[Dst MAC Entry]
Match condition: Dst MAC=X and VID=Z
Instruction: Write-Metadata=1
   Write-Action (OUTPUT=A)
   Goto Table=1
[Src MAC Entry]
Match condition: Metadata=1 and Inport=B and Src MAC=Y and VID=Z
Instruction: None (1) When neither the Dst MAC entry 107 nor the Src MAC entry 110 is hit:

The packet processing unit (not shown in the drawing) of the communication node 102 searches for an entry having a match condition that matches a packet received from the input port B in Table 0 (sign 106). Since the Dst MAC entry 107 does not exist, the Miss-hit entry 108 is hit and a search in Table 1 (sign 109) is started without raising a flag in Metadata. Since no Src MAC entry 110 having a match condition that matches the received packet exists in the search in Table 1 (sign 109), the broadcast entry 111 is hit and the packet is broadcast.

(2) When the Dst MAC entry 107 is hit and the Src MAC entry 110 is not hit:

The packet processing unit (not shown in the drawing) of the communication node 102 searches for an entry having a match condition that matches a packet received from the input port B in Table 0 (sign 106). Since the Dst MAC entry 107 matching the received packet is found, the packet processing unit (not shown in the drawing) starts a search in Table 1 (sign 109) after executing the contents of the instruction field (Write-Metadata=1, Write-Action (OUTPUT=A)). However, as a result of the search in Table 1 (sign 109), no Src MAC entry 110 having a match condition that matches the received packet exists, the broadcast entry 111 is hit and the packet is broadcast.

(3) When the Dst MAC entry 107 is not hit and the Src MAC entry 110 is hit:

The packet processing unit (not shown in the drawing) of the communication node 102 searches for an entry having a match condition that matches a packet received from the input port B in Table 0 (sign 106). Since the Dst MAC entry 107 does not exist, the Miss-hit entry 108 is hit and a search in Table 1 (sign 109) is started without raising a flag in Metadata. Although Table 1 (sign 109) has the Src MAC entry 110 having a match condition that matches the Src MAC address of the received packet, they are not deemed to match since no flag is raised in Metadata. The broadcast entry 111 is ultimately hit and the packet is broadcast.

(4) When both the Dst MAC entry 107 and the Src MAC entry 110 are hit:

The packet processing unit (not shown in the drawing) of the communication node 102 searches for an entry having a match condition that matches a packet received from the input port B in Table 0 (sign 106). Since the Dst MAC entry 107 matching the received packet is found, the packet processing unit (not shown in the drawing) starts a search in Table 1 (sign 109) after executing the contents of the instruction field (Write-Metadata=1, Write-Action (OUTPUT=A)). As a result of the search in Table 1 (sign 109), the Src MAC entry 110 having match conditions that match the Src MAC address of the received packet and the contents of Metadata is found, and the packet is ultimately outputted (unicast) from the output port A.

Further, the described functions (corresponding to the destination learning unit 13 and the packet processing unit 14 in FIG. 1) of the communication node can be realized by a computer program having a computer built into the communication node execute each processing described using the hardware thereof.

Next, an overall operation of the present exemplary embodiment will be described in detail with reference to the drawings. First, a topology search operation performed by the control apparatus 101 will be explained. In the explanation below, it is assumed that Src MAC entries setting the MAC addresses of the terminals 1031 and 1032 as match conditions for the source MAC address have been registered in Tables 1 (sign 109) of the communication nodes 1021 to 1024.

(Topology Search)

Figure 5:
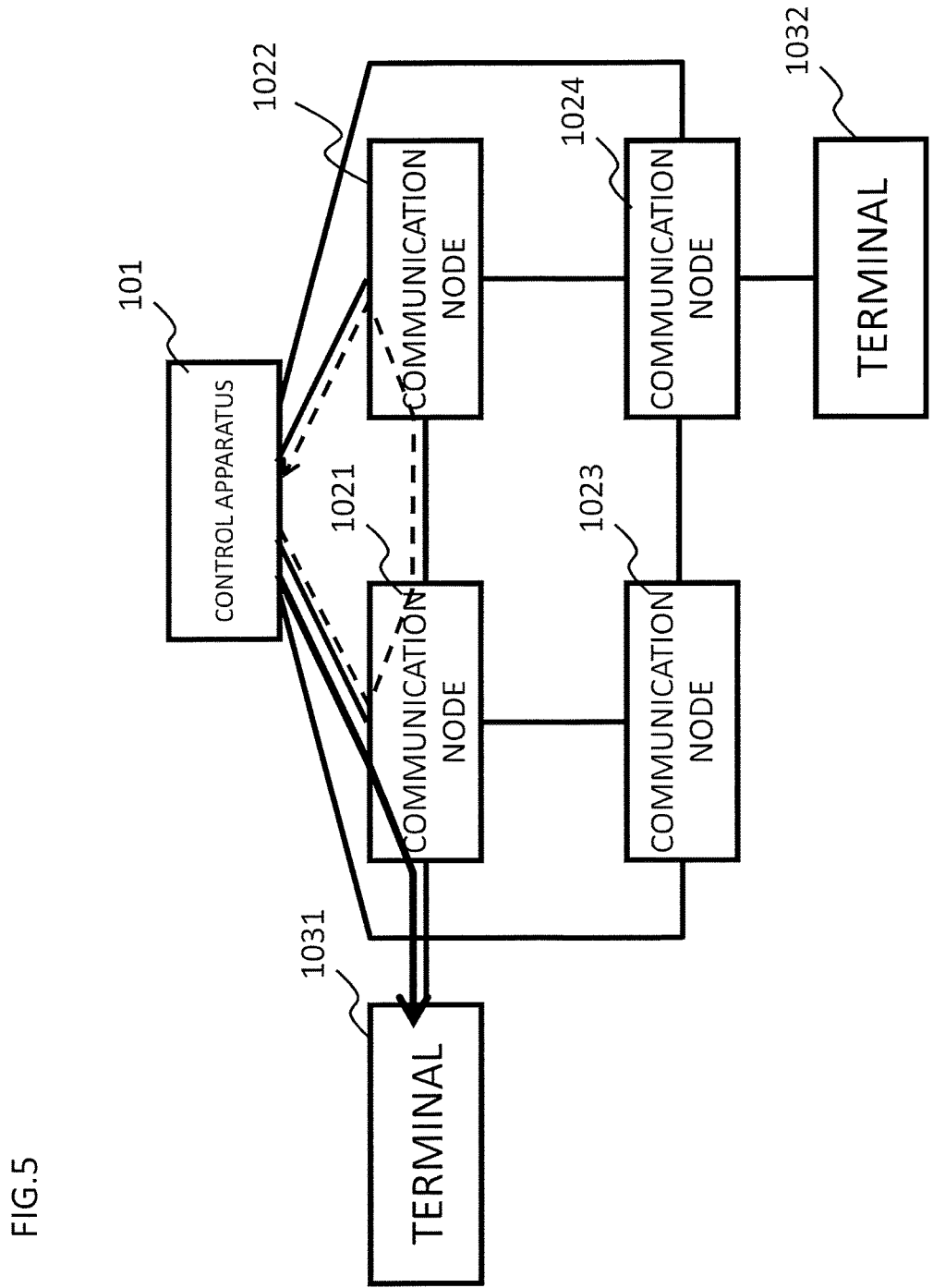
FIG. 5 is a drawing for explaining an operation (topology search) of the first exemplary embodiment.

FIG. 5 is a drawing for explaining an operation (topology search) of the first exemplary embodiment. First, the control apparatus 101 has packets for topology discovery transmitted from all the ports of the communication nodes 1021 to 1024. (For instance, the Packet-Out message in Non-Patent Literature 2 can be used.) Arrows in FIG. 5 indicate the flows of packets for topology discovery transmitted to the communication node 1021 (not showing the flow of a packet forwarded to the communication node 1023). The packets for topology discovery include information for uniquely identifying a source communication nod The packet for topology discovery forwarded from the communication node 1021 to the communication node 1022 is forwarded by the communication node 1022 to the control apparatus 101 (reported by, for instance, the Packet-In message in Non-Patent Literature 2). The control apparatus 101 learns from the information (the information for uniquely identifying a communication node) included in the packet for topology discovery received from the communication node 1022 that a link between the communication node 1021 and the communication node 1022 is connected. The control apparatus 101 learns the ports of the communication nodes link-connected between the communication nodes as inbound ports (ports not connected to the outside).

Meanwhile, the communication node 1021 transmits the packet for topology discovery to the terminal 1031 as well, but this packet is not returned to the control apparatus 101. The control apparatus 101 learns that an applicable port of the communication node 1021 is connected to the outside of the network when not being able to receive the packet for topology discovery from another communication node for a predetermined period of time, as in this case. The control apparatus 101 learns the ports connected to the outside of the network as outbound ports (ports connected to the outside).

The topology of the network constituted by the communication nodes 1021 to 1024 can be grasped by performing the processing described to collect information of the ports of all the communication nodes connected to the control apparatus 101.

Further, a topology discovery method such as the Link Layer Discovery Protocol (LLDP) can be used instead of the procedure above.

(Path Calculation)

Figure 6:
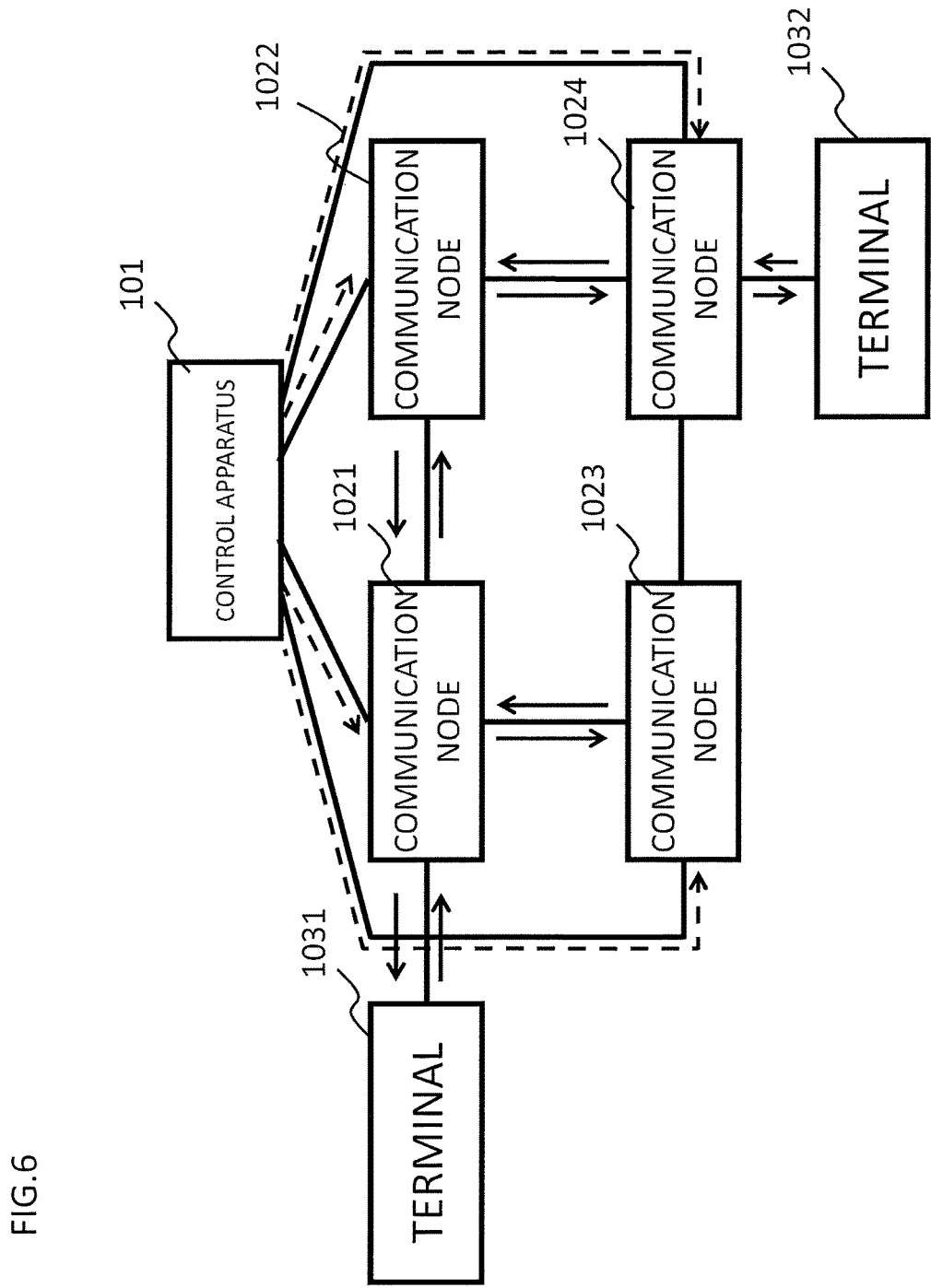
FIG. 6 is a drawing for explaining an operation (path calculation) of the first exemplary embodiment.
Figure 7:
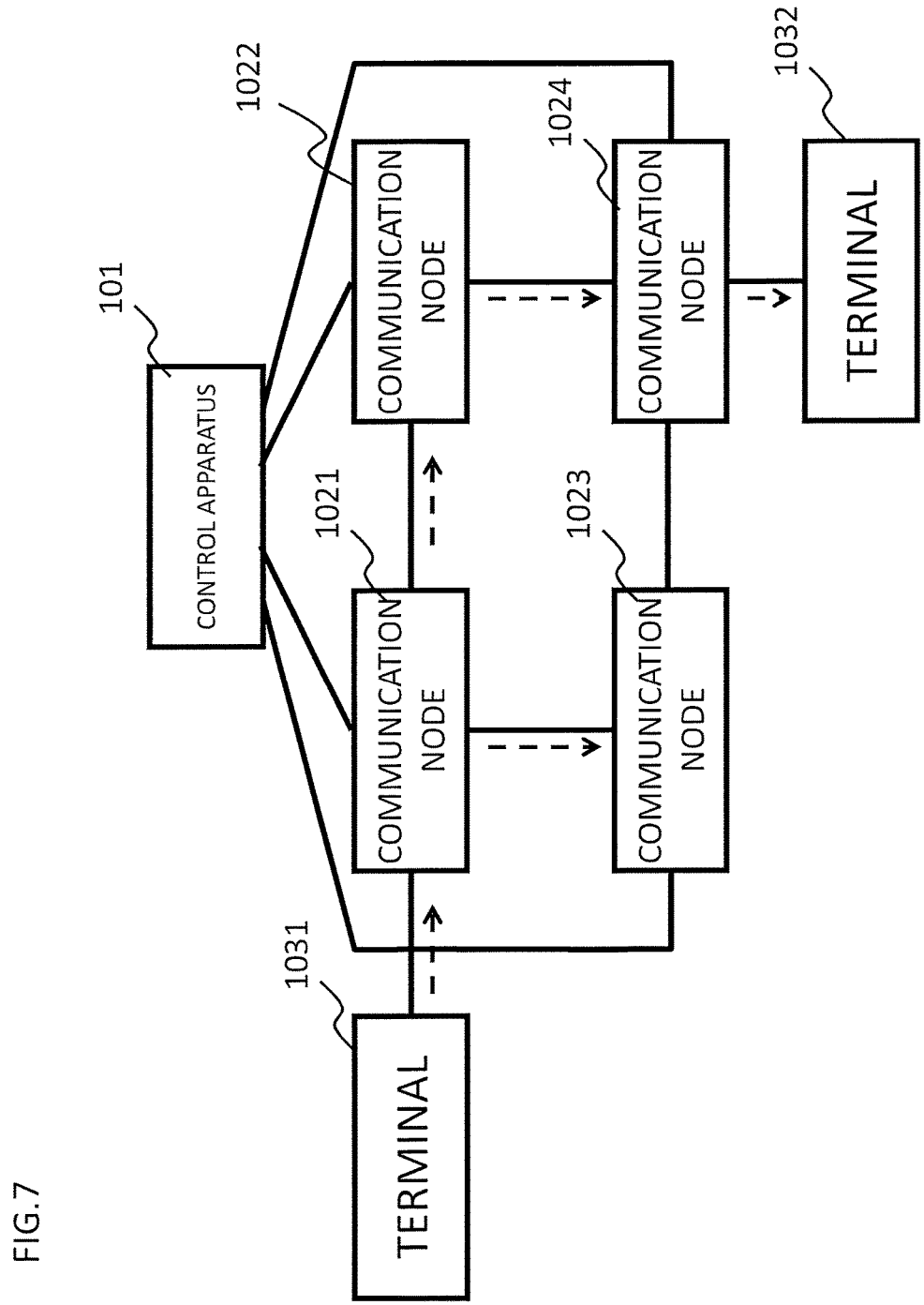
FIG. 7 is a drawing for explaining an operation (destination learning) of the first exemplary embodiment.

After grasping the network topology as described above, the control apparatus 101 calculates broadcast/multicast paths (BCMC paths) in the network. FIG. 6 is a drawing for explaining an operation (path calculation) of the first exemplary embodiment. First, the control apparatus 101 calculates BCMC paths of a packet on the basis of the network topology grasped as described above.

Next, the control apparatus 101 generates the broadcast entry (the third entry) that has the communication nodes on the BCMC paths forward a packet received by an inbound port from other inbound ports and outbound ports on the BCMC paths, and set the entry in Tables 1 (sign 109) of the communication nodes on the path (the dashed arrows in FIG. 6).

Further, the control apparatus 101 generates the broadcast entry (the third entry) that has a packet received by the outbound ports of the communication nodes 1021 to 1024 forwarded to the outbound ports and ports on the BCMC paths, and set the entry in Tables 1 (sign 109) of the communication nodes on the path.

As a result of the above, the entries for forwarding packets have been set as indicated by the arrows in FIG. 6.

(Terminal Detection (Learning the Dst MAC Entry))

Then, when the terminal 1031 transmits a packet to the communication node 1021 at any time during operation, the communication node 1021 generates the Dst MAC entry 107 having the source MAC address of the packet as a match condition, and defining the processing of raising a flag in Metadata as an instruction, forwarding processing from the receiving port of the packet, and the processing of searching Table 1 (sign 109) in the destination learning unit, and registers the entry in Table 0 (sign 106).

Further, the communication node 1021 refers to Table 0 (sign 106) and Table 1 (sign 109) in order and determines a forwarding destination. At this point, since there is no Dst MAC entry 107, an entry matching the packet from the terminal 1031, the communication node 1021 forwards the packet to the BCMC path and an outbound port (if there is any) according to the broadcast entry 111.

Next, the communication nodes 1022 to 1024, which have received the packet with inbound ports thereof on the BCMC path, generate the Dst MAC entry 107 having the source MAC address of the packet as a match condition, and defining the processing of raising a flag in Metadata as an instruction, forwarding processing from the receiving port of the packet, and the processing of searching Table 1 (sign 109), and register the entry in Table 0 (sign 106), as the communication node 1021.

In the communication nodes 1022 to 1024, too, Tables 0 (sign 106) and Tables 1 (sign 109) are referred to in order and a forwarding destination is determined. Since the communication nodes 1022 to 1024 do not have the Dst MAC entry 107, an entry matching the packet from the terminal 1031, either, the communication nodes 1022 to 1024 forward the packet to the BCMC path and an outbound port (if there is any) according to the broadcast entry 111.

As a result of the above, the packet transmitted from the terminal 1031 to the communication node 1021 is forwarded to the terminal 1032 according to the arrows in FIG. 6.

(Response Packet Forwarding (Forwarding to a Learned Destination))

Then, when the terminal 1032, which has received the packet from the terminal 1031, transmits a packet destined for the terminal 1032 to the communication node 1024, the communication node 1024 forwards the packet from a port designated by the Dst MAC entry 107 since the MAC address of the terminal 1031 has been learned (the Dst MAC entry 107 has been registered), and Table 1 (sign 109) has the Src MAC entry setting the MAC addresses of the terminals 1031 and 1032 as match conditions for the source MAC address registered.

The communication nodes 1022 and 1021 forward the packet from a port designated by the Dst MAC entry 107 since the communication nodes 1022 and 1021 have learned the MAC address of the terminal 1031 as well (the Dst MAC entry 107 has been registered) and Tables 1 (sign 109) have the Src MAC entry setting the MAC addresses of the terminals 1031 and 1032 as match conditions for the source MAC address registered.

Figure 8:
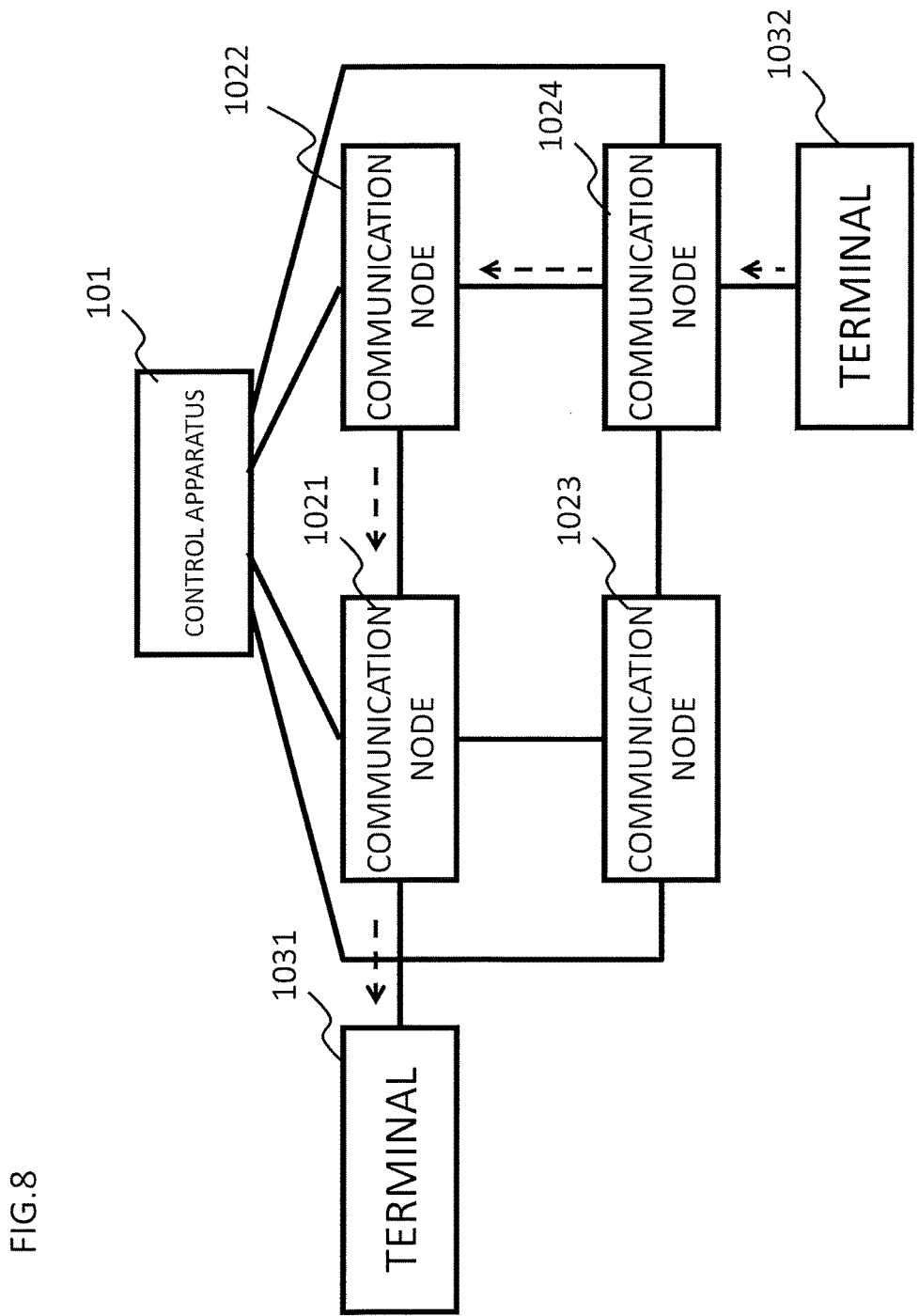
FIG. 8 is a drawing for explaining an operation (packet forwarding) of the first exemplary embodiment.

As a result of the above, the packet transmitted from the terminal 1032 to the communication node 1024 is forwarded to the terminal 1032 along the arrows in FIG. 8.

As described, according to the present exemplary embodiment, packet forwarding equivalent to L2 switching is realized using a centralized control network. Further, the occurrence of a loop is prevented in the present exemplary embodiment since unlearned packets are forwarded via the BCMC paths calculated by the control apparatus 101 on the basis of the network topology, unlike L2 switching where packets are flooded from non-receiving ports. Further, although this was not explained in the exemplary embodiment above, it is possible to minimize an increase in the number of entries by setting an appropriate timeout value in the Dst MAC entry 107 and performing aging processing.

Further, according to the present exemplary embodiment, when a failure occurs in a link between any of the communication nodes, it is possible to set and learn an alternate path. The process thereof will be described below.

(Bypass Processing)

Here, a case where a failure occurs in the link between the communication nodes 1021 and 1022 in FIG. 9 will be explained. First, the communication nodes 1021 and 1022 notify the control apparatus 101 of a port down state and request the control apparatus 101 to recalculate a broadcast path and reset necessary entries.

Upon receiving the notification, the control apparatus 101 updates the network topology grasped through the process described above (Topology Search) on the basis of the notification contents.

Next, the control apparatus 101 recalculates the BCMC paths using the same process (Path Calculation) described above.

Figure 9:
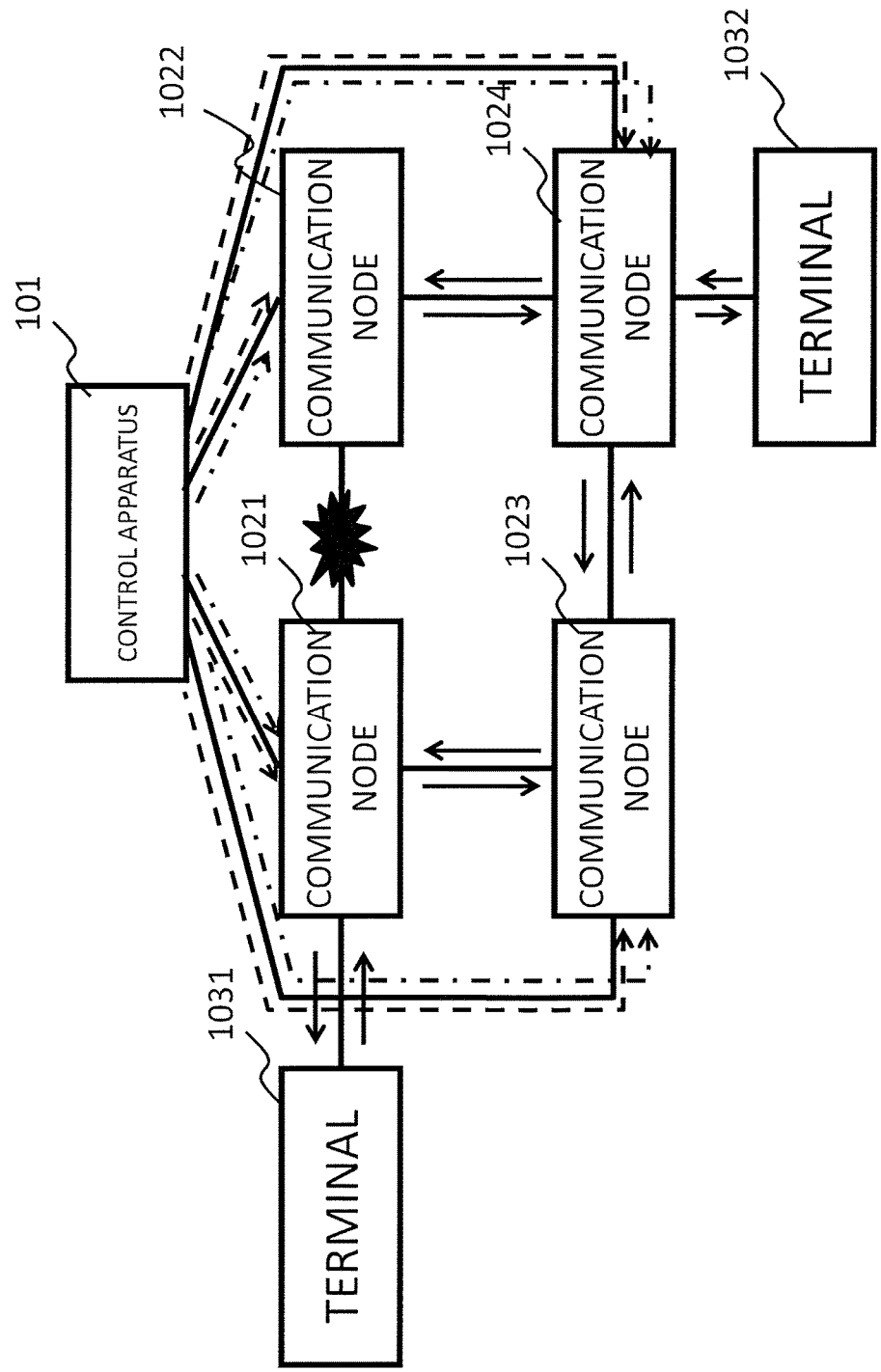
FIG. 9 is a drawing for explaining an operation (failure recovery) of the first exemplary embodiment.

Next, as in the process (Path Calculation) described above, the control apparatus 101 generates the broadcast entry (the third entry) that forwards packets received from the outbound ports of the communication nodes 1021 to 1024 to the outbound ports and the ports on the BCMC paths, and sets the entry in Tables 1 (sign 109) of the communication nodes on the paths (the dashed arrows in FIG. 9).

Finally, the control apparatus 101 instructs the communication nodes 1021 to 1024 to delete the Dst MAC entry storing a learned MAC address (the dotted-and-dashed arrows in FIG. 9).

As a result of the above, when the terminal 1031 transmits a packet thereafter, the MAC address is learned as described above (Terminal Detection (Learning the Dst MAC Entry)) (Response Packet Forwarding (Forwarding to a Learned Destination)), and the packet is forwarded along a path via the communication nodes 1021, 1023, and 1024.

An exemplary embodiment of the present invention has been described above, however, the present invention is not limited to the exemplary embodiment described and further modifications, substitutions, and adjustments can be added within the scope of the basic technological concept of the present invention. For instance, the network configuration and the configuration of the elements shown in each drawing is merely an example to facilitate the understanding of the present invention, which is not limited to these configurations shown in the drawings.

Further, for instance, in the exemplary embodiment described above, MAC addresses is used as match conditions in the first table (Table 0 (sign 106)) and the second table (Table 1 (sign 109)), however, other addresses such as an IP address can be used as a match condition. Further, although VLAN IDs and input ports are used as match conditions in the exemplary embodiment above, these items may be omitted and other items may be added as match conditions. Further, it is possible to set only "Metadata=1" (i.e., the first table is hit) as a match condition in the second table (Table 1 (sign 109)) as described in the first exemplary embodiment.

Further, in the exemplary embodiment described above, rewriting Metadata, Action (forwarding from a designated port), and referring to the next table by the Goto command are set as Instructions for when the first table (Table 0 (sign 106)) is hit, but header rewrite may be instructed as an Instruction. For instance, it becomes possible to write information corresponding to the packet type in the first table (Table 0 (sign 106)) and assign processing according to the packet type in the second table (Table 1 (sign 109)).

Finally, preferred modes of the present invention will be summarized.

[Mode 1]
(Refer to the communication node according to the first aspect.)
[Mode 2]
In Mode 1,
the communication node having the address of a terminal connected to a network set as a match condition of the second entry. [Mode 3]
In Mode 1 or 2,
the communication node having a third entry that instructs a search in the second table when the first table does not have a first entry having a match condition that matches a received packet registered.
[Mode 4]
In any one of Modes 1 to 3,
the communication node requesting the control apparatus to recalculate a broadcast path and reset the second and fourth entries when a failure occurs in a link to another communication node.
[Mode 5]
In any one of Modes 1 to 4,
the communication node performing aging processing at least on the first entry on the basis of a predetermined timeout value.
[Mode 6]
(Refer to the communication system according to the second aspect.)
[Mode 7]
(Refer to the control apparatus according to the third aspect.)
[Mode 8]
(Refer to the packet forwarding method according to the fourth aspect.)
[Mode 9]
(Refer to the program according to the fifth aspect.)

Further, Modes 6 to 9 can be developed into Modes 2 to 5 as Mode 1.

Further, the disclosure of each Non-Patent Literature listed above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, the ranges of the numerical values used in the present description should be interpreted as a specific numeric value or small range included in the ranges even in cases where it is not stated so.

10, 102, 1021 to 1024: communication node
11: first table
12: second table
13: destination learning unit
14: packet processing unit
20, 101: control apparatus
103: protocol control unit
104: input port
105: table storage unit
106: Table 0
107: Dst MAC entry (first entry)
108: Miss-hit entry (fourth entry)
109: Table 1
110: Src MAC entry (second entry)
111: Broadcast entry (third entry)
112: output port
A to C, 1031, 1032: terminal

The invention claimed is:

1. A communication node comprising:
a first table that stores a first entry in which a first match condition that includes at least a first destination address that is associated with a first output destination;
a second table that stores a second entry having a second match condition set by a control apparatus and a third entry set by the control apparatus, the control apparatus being remote from the communication node;
a destination learning unit that registers a set of a source address of a received packet and a receiving port of the received packet as the first entry in the first table; and
a packet processing unit that forwards a packet to the first output destination when a match condition matching the packet is found from each of the first table and the second table, and that broadcasts the packet according to the third entry when a match condition is not found in one of the first table and the second table, wherein the broadcast of the received packet is executed in accordance with a broadcast path calculated by the control apparatus.

2. The communication node according to claim 1, wherein an address of a terminal connected to a network is set as a match condition of the second entry.

3. The communication node according to claim 1, wherein the first table stores a fourth entry that instructs a search in the second table when the first table does not have a first entry having a match condition that matches a received packet is registered.

4. The communication node according to claim 1, wherein the control apparatus recalculates a broadcast path and resets the first entry and the second entry when a failure occurs in a link to another communication node.

5. The communication node according to claim 1, wherein the communication node performs an aging processing at least on the first entry on the basis of a predetermined timeout value.

6. A communication system including:
a plurality of communication nodes that comprise:
a first table that stores a first entry in which a first match condition that includes at least a first destination address that is associated with a first output destination;
a second table that stores a second entry and a third entry, the second entry having a second match condition;
a destination learning unit that registers a set of a source address of a received packet and a receiving port of the received packet as the first entry in the first table; and
a packet processing unit that forwards a packet to the first output destination when a match condition matching the packet is found from each of the first table and the second table, and that broadcasts the packet according to the third entry when a match condition is not found in one of the first table and the second table; and
a control apparatus that sets the second entry and the third entry in the communication nodes,
wherein the control apparatus is remote from the plurality of communication nodes, and
wherein the broadcast of the received packet is executed in accordance with a broadcast path calculated by the control apparatus.

7. A control apparatus connected to a plurality of communication nodes that comprise:
a first table that stores a first entry in which a first match condition that includes at least a first destination address that is associated with a first output destination;
a second table that stores a second entry and a third entry, the second entry having a second match condition;
a destination learning unit that registers a set of a source address of a received packet and a receiving port of the received packet as the first entry in the first table; and
a packet processing unit that forwards a packet to the first output destination when a match condition matching the packet is found from each of the first table and the second table, and that broadcasts the packet according to the third entry when a match condition is not found in one of the first table and the second table,
wherein the control apparatus calculates a broadcast path in a network constituted by the plurality of communication nodes and sets entries in at least the second tables of the communication nodes according to the broadcast path, wherein the control apparatus is remote from the plurality of communication nodes, and
wherein the broadcast of the received packet is executed in accordance with a broadcast path calculated by the control apparatus.

8. The control apparatus according to claim 7, wherein the control apparatus recalculates the broadcast path and resets the first entry and the second entry when a failure occurs in a link between communication nodes.

9. A packet forwarding method performed by a communication node, the method comprising:
storing a first entry in which a first match condition that includes at least a first destination address that is associated with a first output destination in a first table;
storing a second entry having a second match condition and a third entry in a second table;
registering a set of a source address of a received packet and a receiving port of the received packet as the first entry in the first table;
forwarding a packet to the first output destination when a match condition matching the packet is found from each of the first table and the second table; and
broadcasting the packet according to the third entry when a match condition is not found in one of the first table and the second table,
wherein the second entry and the third entry are set by a control apparatus that is remote from the communication node, and
wherein the broadcast of the packet is executed in accordance with a broadcast path calculated by the control apparatus.

10. A non-transitory computer-readable recording medium storing a program, which when executed by a processor of a communication node, causes the communication node to execute a packet forwarding method, the method comprising:
storing a first entry in which a first match condition that includes at least a first destination address that is associated with a first output destination in a first table;
storing a second entry having a second match condition and a third entry in a second table;
registering a set of a source address of a received packet and a receiving port of the received packet as the first entry in the first table;
forwarding a packet to the first output destination when a match condition matching the packet is found from each of the first table and the second table; and
broadcasting the packet according to the third entry when a match condition is not found in one of the first table and the second table,
wherein the second entry and the third entry are set by a control apparatus that is remote from the communication node, and
wherein the broadcast of the packet is executed in accordance with a broadcast path calculated by the control apparatus.

11. The communication node according to claim 1, wherein the packet processing unit broadcasts the packet according to the third entry when a match condition is found for the first table and a match condition is not found for the second table.

12. The communication node according to claim 11, wherein the packet processing unit broadcasts the packet according to the third entry when a match condition is not found for the first table and a match condition is found for the second table.

* * * * *

UNITED STATES PATENT AND TRADEMARK OFFICE
CERTIFICATE OF CORRECTION

PATENT NO.         : 9,819,584 B2
APPLICATION NO.    : 14/426626
DATED              : November 14, 2017
INVENTOR(S)        : Masanori Takashima et al.

Page 1 of 1

It is certified that error appears in the above-identified patent and that said Letters Patent is hereby corrected as shown below:

On the Title Page

Column 1 (71), Line 1:
Before "Tokyo", insert --Minato-ku,--

In the Specification

Column 6, Line 40:
"Goto Table 32 1" has been replaced with --Goto Table=1--

Signed and Sealed this
Seventh Day of August, 2018

Andrei Iancu
*Director of the United States Patent and Trademark Office*